Patented June 30, 1942

2,287,934

UNITED STATES PATENT OFFICE 2,287,934

MANUFACTURE OF FLUORO-HYDROCARBONS

Aristid V. Grosse and Carl B. Linn, Chicago, Ill., assignors to Universal Oil Products Company, Chicago, Ill., a corporation of Delaware No Drawing. Application October 31, 1938, Serial No. 238,051

7 Claims. (Cl. 260—653)

This invention relates particularly to the manufacture of compounds having the general formula, R—CF$_2$—R' in which R may be an alkyl radical such as CH$_3$, C$_2$H$_5$, etc., R' may be a hydrogen atom or an alkyl radical, and the other letters have the values commonly assigned to them as representing chemical elements.

The invention is more specifically concerned with the manufacture of the above compounds under particular conditions in respect to temperature control so that side reactions are minimized and practical yields of the desired products are obtained.

Compounds of the above general formula are known as di-fluoro-paraffins and are completely stable in that they do not split off hydrogen fluoride on standing under ordinary temperature and pressure conditions or during distillation as do some alkyl fluorides, especially tertiary fluorides. The compounds have generally a pleasant odor and are utilizable as refrigerating liquids.

In one specific embodiment the present invention comprises the manufacture of di-fluoro-paraffins by reacting hydrocarbons of the acetylene series of higher molecular weight than acetylene with liquid anhydrous hydrogen fluoride.

The operations by which the compounds of the invention are prepared are relatively simple. In batch or intermittent processes, hydrogen fluoride is liquefied and brought to the proper reaction temperature in a vessel surrounded by a heat-absorbing bath, such as, for example, a mixture of acetone and carbon dioxide, in case operations are conducted at low temperatures of the order of 0° C. or lower. While the desired reactions will take place to produce substantial yields of di-fluoro-paraffins at temperatures up to the normal boiling point of hydrogen fluoride, to wit, +20° C., low temperatures favor more selective reactions over those resulting from polymerization. In practical operations, copper lined vessels have been found to give the best service. The acetylene hydrocarbon is then slowly introduced below the surface of the liquefied hydrogen fluoride at a rate which permits the abstraction of the heat of reaction so that the temperature is not allowed to rise above a fixed point. As will be shown in later numerical examples, it is necessary to maintain a considerable excess of hydrogen fluoride at all times to eliminate the tendency of the acetylene hydrocarbons to polymerize and insure the direct addition of hydrogen fluoride as a predominating reaction. When the proper amount of acetylene hydrocarbon has been introduced and there is still an excess of liquid hydrogen fluoride, operations are stopped and the upper layer of fluoride is withdrawn. Obviously the operation may be made continuous by providing means for the controlled addition of both the acetylene hydrocarbon and the hydrogen fluoride at one point in a reaction vessel and separation of the two layers at another point with the return of unconverted hydrogen fluoride.

The products of the reaction are washed with alkaline materials and dried with calcium chloride and distilled for a final purification.

The typical reaction involved in the present instance is shown by the following equation:

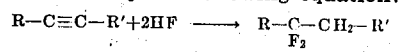

$$R-C{\equiv}C-R' + 2HF \longrightarrow R-\underset{F_2}{C}-CH_2-R'$$

The reaction is characteristic of all compounds of the acetylene series except acetylene itself up to the point where difficulties are encountered by the solidification of the higher molecular weight members of the series or the fluorinated products at the necessary temperatures of the reaction, and under these circumstances, the use of hydrocarbon solvents may be resorted to.

The following numerical data is given to illustrate the scope of the invention, but it is not intended that the invention be in any way limited thereby.

A number of runs were conducted on different hydrocarbons, the results of which are summarized in the following table:

| | Propyne | Hexyne-1 | Hexyne-3 | Heptyne-1 |
|---|---|---|---|---|
| Alkyne charged: | | | | |
| Mols | 0.47 | 0.212 | 0.361 | 0.297 |
| Grams | 19 | 17.4 | 29.6 | 28.5 |
| Temp. reaction °C | −66 to −71 | −55 to −60 | −65 to −70 | −40 to −70 |
| Time of addition of hydrocarbon minutes | 90 | 70 | 70 | 65 |
| Hydrogen fluoride charged: | | | | |
| Mols | 4.30 | 2.17 | 3.57 | 4.85 |
| Grams | 86.0 | 43.4 | 71.5 | 97.1 |
| Crude, water insoluble product recovered grams | 23.3 | 22.1 | 39.4 | 34.5 |
| Concentration of pure di-fluoride in crude product as shown by distillation wt. percent | 100 | 79 | 85 | 60 |
| Yield di-fluoride based on alkyne charge percent | 61 | 68 | 76 | 52 |

In all cases there was some production of amorphous solid materials produced by the polymerization of the acetylene hydrocarbons, but these were heavy and readily separable from the desired reactant products.

The following tabulation shows a comparison of the properties of the products as reported previously in the chemical literature and as produced, and shows that the products of the reaction were substantially pure.

| Reactants, HF+ Product | Propyne | | Hexyne-1 | | Hexyne-3 | | Heptyne-1 | |
|---|---|---|---|---|---|---|---|---|
| | 2, 2-di-fluoro propane | | 2, 2-di-fluoro hexane | | 3, 3-di-fluoro hexane | | 2, 2-di-fluoro heptane | |
| | Report. | Prod. | Report. | Prod. | Report. | Prod. | Report. | Prod. |
| Properties: | | | | | | | | |
| Percent H | 7.56 | 7.54 | 9.91 | 9.46 | 9.91 | 9.81 | 10.37 | 10.32 |
| Percent C | 44.97 | 45.00 | 58.97 | 56.42 | 58.97 | 58.76 | 61.70 | 61.51 |
| Percent F | 47.47 | 47.00 | 31.12 | 34.12 | 31.12 | 31.43 | 29.93 | 28.17 |
| Mol. wt | 80.05 | 77 | 122.10 | 122 | 122.10 | 120 | 136.12 | 134 |
| B. P | −0.5°/760 mm. | −0.5°/755 mm. | | 86.1°/750 mm. | | 86.0°/742 mm. | | 111.1°/749 mm. |
| $N_D^t$ | | 1.3118 | | 1.3538 | | 1.3553 | | 1.3651 |
| | | −42.5° | | +20.0° | | +20.0° | | +21.5° |
| $D_4^{20}$ | | 1.03 at −80 | | .8918 | | .9024 | | .8889 |
| M. P | | −104.8 | | | | | | |

We claim as our invention:

1. A process for the manufacture of di-fluoroparaffins which comprises interacting a member of the acetylene series of higher molecular weight than acetylene with a molal excess of substantially anhydrous liquid hydrogen fluoride at a temperature below the boiling point of hydrogen fluoride.

2. A process for the manufacture of di-fluoroparaffins which comprises gradually introducing a liquefied member of the acetylene series of hydrocarbons of higher molecular weight than acetylene into substantially anhydrous liquid hydrogen fluoride at a temperature below the boiling point of hydrogen fluoride, while abstracting heat of reaction to prevent substantial temperature rise, and maintaining a molal excess of hydrogen fluoride.

3. A process for the manufacture of 2,2-difluoro-propane which comprises gradually introducing propyne into substantially anhydrous liquid hydrogen fluoride at a temperature below 0° C., while abstracting heat of reaction to prevent substantial temperature rise, and maintaining a molal excess of hydrogen fluoride.

4. A process for the manufacture of di-fluorohexanes which comprises gradually introducing hexynes into substantially anhydrous liquid hydrogen fluoride at a temperature below 0° C., while abstracting heat of reaction to prevent substantial temperature rise, and maintaining a molal excess of hydrogen fluoride.

5. A process for the manufacture of di-fluoroheptanes which comprises gradually introducing heptynes into substantially anhydrous liquid hydrogen fluoride at a temperature below 0° C., while abstracting heat of reaction to prevent substantial temperature rise, and maintaining a molal excess of hydrogen fluoride.

6. A process for producing difluoro-paraffins which comprises reacting a hydrocarbon of the acetylene series and of higher molecular weight than acetylene with substantially anhydrous liquid hydrogen fluoride at a temperature not appreciably in excess of 0° C. while maintaining a molal excess of hydrogen fluoride.

7. A process for producing difluoro-paraffins which comprises introducing to a reaction zone a hydrocarbon of the acetylene series and of higher molecular weight than acetylene and a molal excess of substantially anhydrous liquid hydrogen fluoride, reacting said hydrocarbon with hydrogen fluoride in the reaction zone, and abstracting sufficient heat from said zone to maintain therein a reaction temperature below 0° C.

ARISTID V. GROSSE.
CARL B. LINN.